United States Patent [19]

Bollfrass et al.

[11] 4,373,754
[45] Feb. 15, 1983

[54] THREADED CONNECTOR

[75] Inventors: Charles A. Bollfrass; Leonard S. Landriault; Patrick E. McDonald, all of Houston, Tex.

[73] Assignee: Hydril Company, Los Angeles, Calif.

[21] Appl. No.: 270,315

[22] Filed: Jun. 4, 1981

Related U.S. Application Data

[63] Continuation of Ser. No. 932,278, Aug. 9, 1978.

[51] Int. Cl.³ .................. F16L 25/00; F16L 21/00
[52] U.S. Cl. .................................. 285/334; 285/355
[58] Field of Search ............... 411/411; 285/334, 333, 285/355, 390; 428/174, 36, 156, 157, 161–164, 166, 174; 403/343

[56] References Cited

U.S. PATENT DOCUMENTS

| | | | |
|---|---|---|---|
| 1,909,489 | 5/1933 | Eaton | 285/390 |
| 1,932,427 | 10/1933 | Stone | 285/383 |
| 2,006,520 | 7/1935 | Stone et al. | 285/334 |
| 2,211,179 | 8/1940 | Stone | 285/334 |
| 2,893,759 | 7/1959 | Blose | 285/334 |
| 2,992,019 | 7/1961 | MacArthur | 285/334 |
| 3,224,799 | 12/1965 | Blose et al. | 285/334 |
| 3,359,013 | 12/1967 | Knox et al. | 285/334 |
| 3,989,284 | 11/1976 | Blose | 285/334 |
| 4,161,332 | 7/1979 | Blose | 285/334 |
| 4,192,533 | 3/1980 | Blose | 285/334 |
| 4,244,607 | 1/1981 | Blose | 285/334 |

FOREIGN PATENT DOCUMENTS

| | | | |
|---|---|---|---|
| 2717795 | 3/1977 | Fed. Rep. of Germany | 285/334 |
| 89471 | 6/1958 | Netherlands | 403/343 |

*Primary Examiner*—William J. Van Balen
*Attorney, Agent, or Firm*—Dodge & Bush

[57] ABSTRACT

A new and improved threaded connector having one or more non-tapered threads on separate diametral steps with at least one flank "hooked" so as to achieve a tensile strength approximately that of the tubular body, is disclosed. The wall thickness of the female member is controlled to improve thread loading and enable inwardly radial movement with the male member to prevent "pulling out" under axial tensile loading. The outer thread step on the male member may only partially engage the threads on the female member such that the critical reduction of the tube wall thickness at the thread roots is a minimum. The resulting threaded connection formed on tubular members has a tensile efficiency in excess of the tube body yield strength and approaching that of the tube body ultimate tensile strength.

20 Claims, 3 Drawing Figures

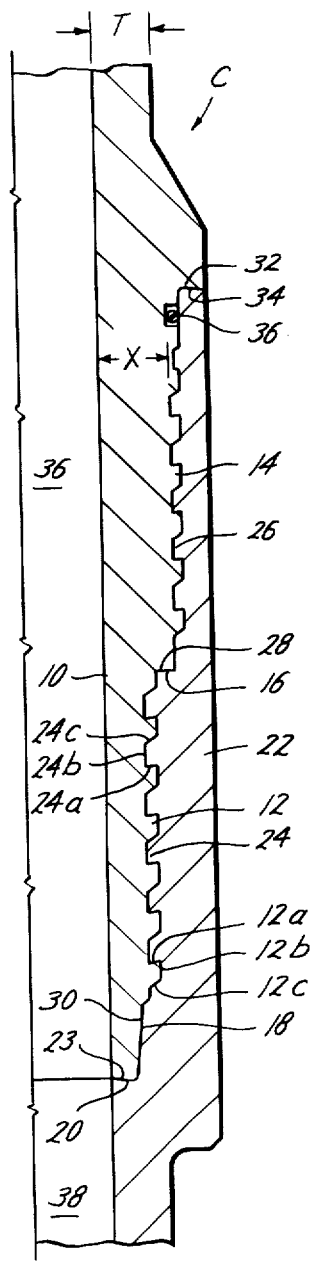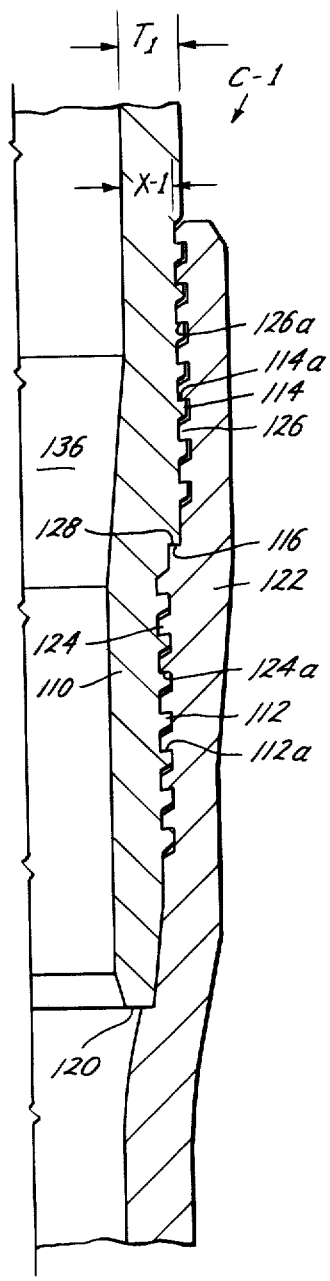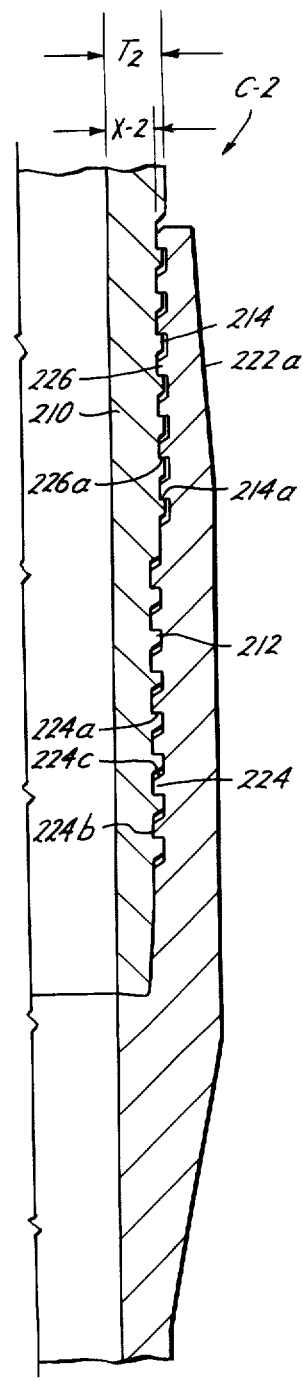

THREADED CONNECTOR

This application is a continuation of application Ser. No. 932,278, filed Aug. 9, 1978.

BACKGROUND OF THE INVENTION

This invention relates generally to the field of threaded connectors and in particular to threaded connectors for tubular goods.

The need for a threaded connector for tubular goods having an axial tensile capability substantially equal to that of the tubular goods has long been recognized. By tubular goods it is to be understood that drill pipe, work tubing, production tubing, well casing and other such conduits used in a well are included. It is also to be understood that the use of the threaded connector of the present invention is not to be considered limited to such tubular goods.

Previously, in achieving the tensile strength need in tubular goods certain undesired features resulted. For instance, the American Petroleum Institute (API) Buttress thread connection utilizes vanishing, tapered threads to achieve a loading capability approximating full tensile capacity of the tubular member. However, the high radial thread interference required to resist separation of the connected tubular members under axial loading creates a high surface contact stress that results in galling and other localized thread damage that severely limits the number of times the connection can be made up. In addition to providing only limited usability of the thread connection, the area of high radial interference stress is especially susceptible to a form of stress corrosion cracking that is found to occur in petroleum well conduits known as sulfide stress cracking. For an example of such a threaded connection having negative angled load flanks, see U.S. Pat. No. 3,224,799.

To overcome the problem of radial interference stress in the threaded connection, threaded connections for tubular goods having radial clearance for all but the loading flank of the threads have been developed. U.S. Pat. No. 1,932,427 to Stone discloses such a radial clearance in a two-step tapered thread connection formed on a pipe upset having a greater stabbing depth to prevent cross-threading. U.S. Pat. Nos. 2,006,520 and 2,211,179 disclose additional variations of the non-tapered two-step threads having radial clearance and which provide make-up shoulders for increasing the usability or number of times the threaded connection may be made up. In U.S. Pat. No. 2,992,019, an inner seal that is responsive to the internal fluid pressure is disclosed for use with such radial clearance two-step threads.

U.S. Pat. No. 3,989,284 to Blose discloses a threaded connection in which the pin or male member is placed in hoop tension when the connection is made up due to the dove-tail and wedging engagement of the threads. The formation of this tapered and dovetail thread profile is both complex to manufacture and very expensive.

In Blose U.S. patent application, Ser. No. 679,476, filed Apr. 22, 1976, now abandoned, assigned to the assignee of the present invention, there is disclosed a two-step thread connection having a negative angled "hook-thread" engagement and which has a tensile strength greater than the pipe body. To obtain that strength it was necessary to form the threads on collars having a wall thickness greater than the pipe wall thickness to which the collars were then welded. The rigid thick walled collars for this connection made such connections difficult to install in the well bore as they required significant outer annular clearance.

Each of the foregoing mentioned patents is hereby totally incorporated herein as written disclosure by this specific reference as is fully set out herein.

SUMMARY OF THE INVENTION

The field of the present invention is threaded connectors.

A radial clearance threaded connector is provided with negative angled load carrying thread flanks (hook threads) formed on both the male and female members. The external shape of the female member is tapered to provide a more desirable uniform load distribution on the load carrying thread flanks. Also, the female member will flex radially inwardly with the male member to prevent "pull out". When under axial loading the pin will shrink due to the "Poisson's" effect. By using partial thread height, the thread depth of the pin member of the outer step is reduced providing a greater thickness of pipe or root depth at the load limiting thread for providing the greater tensile strength for the connection.

An object of the present invention is to provide a new and improved threaded connector having superior tensile strength.

Another object of the present invention is to provide a new and improved threaded connector in which the female member can move radially inward to prevent "pulling out" under tensile loading.

BRIEF DESCRIPTION OF THE DRAWINGS

FIG. 1 is a side view, in section, of a prior art two-step threaded connection, generally designated C, using negative angled load flanks to provide "hook threads" such as disclosed in the aforementioned Blose patent application. The upset male or pin member 10 is provided with exterior helical threads forming lower and upper thread zones 12 and 14, respectively, which are non-tapered and of different diameters. While single pitch threads are preferred in each zone, multiple pitch threads may be used. Between the thread zones 12 and 14 is a make-up shoulder 16 which limits the torque make-up on the threads of the connection in the known manner. An annular inner sealing surface or zone 18 is disposed adjacent the lower annular shoulder 20 of the pin member 10 and which may incorporate the previously mentioned pressure responsive seal. The shoulder 20 also favors another made up shoulder.

The upset female or box member 22 is provided with complementary internal cylindrical helical threads forming thread zones 24 and 26 that are adapted to threadedly engage the cylindrical thread zones 12 and 14, respectively, on the pin member 10 when the threaded connection is made up. Between the thread zones 24 and 26 is an annular stop shoulder 28 that is adapted to engage the shoulder 16 of the pin member 10 to limit rotational make-up of the joint. The box member 22 is provided with a sealing zone 30 which is adapted to effect the inside or inner seal with the seal portion 18 of the pin member 10 above annular stop shoulder 20 of the pin 10 which engages torque limiting shoulder 23. An upper stop make-up shoulder 32 is formed on the box member 22 for engaging the downwardly facing stop shoulder 34 formed on the upset pin member 10 to provide a third shoulder engagement to limit rotational make-up. A seal ring 36 carried by the pin 10 adjacent shoulder 34 may be employed to provide a back-up seal to the inner metal-to-metal seal.

While the pin member 10 is illustrated with a central bore 36 and the box member 22 with a central flow passage or bore 38, it is to be again understood that the threaded connector of the present invention is not limited for use with tubular goods. However, for the purposes of a specific utility, and that purpose only, the present disclosure will be made of the preferred embodiment which is for tubular goods for use in wells. It further being understood that such tubular goods are not limited to use in hydrocarbon producing wells but are equally useful in underground hydrocarbon storage wells, geothermal wells, mining techniques, coal gasification, and any other well.

Each of the thread zones 14, 16, 24 and 26 are provided with complementary negatively angled "hook-type" threads such as disclosed in Blose patent application Ser. No. 679,476, and now abandoned. While only the engaged thread profile of mating thread zones 12 and 24 will be described in detail, it is to be understood that the thread profile of the other mating thread zones 14 and 26 are the same except for the diameter. The helical exterior thread 12 formed on the pin 10 is provided with a negatively angled load flank 12a. By negatively angled, it is to be understood that the angle formed by the loading flank 12a is to be described with respect to a sectional view with the flank 12a at the section inclined negatively to the longitudinal axis of the tubular pin 10 or connection C. To avoid creating radial interference stresses, helical thread 12 is provided with radial clearance surface 12b which is slightly spaced from the root of the helical thread 24 carried by the box member 22. Clearance is also provided between the lower flank 12c of the thread 12 and the thread 24 on the box member 22 to avoid interference stresses.

The negatively angled loading flank 24a of the helical thread 24 engages the negatively angled load flank 12a of the box 22 for transmitting the tension loading between threads 12 and 24. The helical thread 24 is also provided with radial clearance at its outer surface 24b and its upper clearance flank 24c to also avoid any interference strain with the thread 12 on the pin 10. The connection C is made-up by inserting or stabbing the pin 10 and particularly outermost shoulder 20 within the box 22 and then rotating the pin 10 for making up the two-step threads until the seating shoulders 16 and 28 are brought into engagement as well as shoulder 32 with 34 and 20 with shoulder 23. Such arrangement is well known to those skilled in the art and is set forth herein for identifying the improvement of the present invention.

To achieve the desired tensile strength in the prior art connection it has been necessary to make the wall thickness of the connection upsets relatively large compared to the wall thickness of the tubular goods. This, of course, was necessary to insure sufficient wall thickness at the critical thread root. In the pin 10, and ignoring the common depth of the recess for annular seal 36, which is optional, the critical wall thickness would be the dimension X. If X is greater than the dimension T which is the wall thickness of the pipe body and if the area of the engaged load flanks is also sufficient, the tensile strength connection C would be equal or greater than the pipe wall T. The box 22 also needed the greater wall thickness at its first thread. Since the box 22 and pin 10 were of such relatively greater thickness than the pipe body T, they did not elastically strain uniformly with the pipe and localized areas of very high stress could develop on the load flanks of the threads. Such localized stresses could exceed the yield strength of the connector C and lead to failure. In addition, the large outer diameter of the connection C required additional annular clearance to install.

A first embodiment of the present invention, generally designated C-1 is illustrated in FIG. 2. In this embodiment, which is preferably used on well conduits, reference characters used in the prior art embodiment of FIG. 1, as increased by a factor of 100, will be used to identify similar parts. The pin 110 is provided with external helical threads forming lower thread zone 112 and upper thread zone 114. Before forming the thread zones 112 and 114 the pin 110 is nosed or permanently compressed or deformed radially inwardly to insure a sufficient wall thickness for the pin 110 adjacent thread zone 112. If desired, the pin bore 136 can be machined to insure a proper bore size adjacent the thread zone 112. The box 122 is also radially expanded outwardly or swaged before forming the thread zones 124 and 126.

The lower annular shoulder 120 of the pin member 110, as well as shoulders 116 and 128, serve as the stop shoulders for limiting threaded engagement and increasing repeatability of make-up without thread damage. The internal helical thread zones 124 and 126 are engageable with the thread zones 112 and 114, respectively, in the usual manner. Radial clearance of the threads and the negative angle of the load carrying flanks is provided in the previously disclosed manner to avoid radial interference stresses in the connection C-1.

While there is full engagement of the thread flanks 112a and 124a on the inner thread diameter of the pin 110, the load carrying flanks 114a and 126a of the threads 114 and 126 may be only partially engaged depthwise. This can best be recognized by comparing the relative size of the radial gaps between threads 112 and 124 and the gaps between threads 114 and 126. The larger radial gap between threads 114 and 126 permit the portion of the box 122 adjacent thread 126 to move or strain radially inwardly, as well as longitudinally, as the tensile loading and stress on the thread carrying flanks increases. As the pin 110 will tend to move radially inward due to the "Poisson's" effect, the box 122 will also move inwardly with the pin 110 and which will resist "pulling out" of the connection C-1 under axial loading. The longitudinal strain movement of the box 122 adjacent thread 126 insures more distributed loading and stress on the partially engaged thread load flank 126a as well as pin thread 114.

To enhance the radially inward movement of the box 122, the box 122 is provided with a reduced wall thickness of the box member 122 in the vicinity of the threads 126 for two purposes. First, the smaller thickness of the box 122 will move radially inwardly in a greater distance in response to the tensile loading. Secondly, the reduced wall thickness will enable better thread loading on the thread flanks 114a and 126a by also aiding distribution of stresses as a result of the longitudinal strain on the box 122 adjacent the threads 126. Thus the partial height engaged thread flanks 126a and 114a will tend to carry a more uniform stress over the entire engagement of the thread flanks than would otherwise occur. This, in part, enables the threads to be only partial height engaged which provides an additional advantage.

This additional advantage is that the pin wall thickness X-1 at the thread depth of the uppermost thread on the pin member 110, can be made larger. Since this wall thickness X-1 at the first thread depth is controlling of the tensile stress that the pin 110 can carry, the greater the wall thickness the greater the strength of the connection C-1. As is illustrated in FIG. 2, the wall thickness dimension X-1 is only slightly less than the wall thickness T-1 of the pipe body which provides a connection having a tensile strength substantially equal to the pipe body.

A second embodiment of the present invention, generally designated C-2, is illustrated in FIG. 3. In this embodiment, which is preferably used on smaller diameter conduits or tubulars, such as production tubing, reference characters used in the prior art embodiment of FIG. 1, as increased by the factor of 200, will be used to identify identical parts. The pin 210 is provided with external helical threads forming lower thread zone 212 and upper thread zone 214. If desired, the pin bore 236 is machined to ensure a proper desired bore size adjacent the thread zone 212. The box 222 is upset before forming the thread zones 224 and 226.

The lower annular shoulder 220 of the pin member 210 serves as the stop shoulder by engaging the box for limiting threaded engagement and increasing repeatability of make-up without thread damage. The internal helical thread zones 224 and 226 which are engageable with the thread zones 212 and 214, respectively, in the usual manner. Radial clearance of the threads and the negative angle of the load carrying flanks is provided in the previously disclosed manner to avoid radial interference stresses in the connection C-2.

While there is full engagement of the thread flanks 212a and 224a on the inner thread diameter of the pin 210, the load carrying flanks 214a and 226a of the threads 214 and 226 are only partial height engaged. This can best be recognized by comparing the relative size of the radial gaps between threads 212 and 224 and the gaps between threads 214 and 226. The larger radial gap between threads 214 and 226 permit the portion of the box 222 adjacent thread 226 to move or strain radially inward as well as longitudinally as the tensile loading and stress on the thread carrying flanks increases. As previously disclosed, the pin 210 will tend to move radially inward due to "Poisson's" effect, the box 222 will also move inwardly with the pin 210 and which will serve to reduce "pulling out" of the connection C-2 under axial loading. The longitudinal strain movement of the box 222 adjacent thread 226 ensures distributed loading and stress on the partial height engaged load flank 226a as well as pin thread 214a.

To enhance the radially inward movement of the box 222, the box 222 is provided with a tapered outside diameter portion 222a in the vicinity of the threads 226. Such taper reduces the wall thickness of the box member 222 in this vicinity for two purposes. First, the smaller thickness of the box 222 will move radially inwardly a greater distance in response to the same tensile loading. Secondly, the reduced wall thickness will enable better thread loading on the thread flanks 214a and 226a by also aiding distribution of stresses as a result of the longitudinal strain on the box 222 adjacent the threads 226. Thus the partial height engaged thread flanks 226a and 214a will tend to carry a more uniform stress over the entire engagement of the thread flanks than would otherwise occur. This, in part, enables the thread to be only partial height engaged and which provides an additional advantage.

This additional advantage is that the pin wall thickness X-2 at the thread depth of the uppermost thread on the pin member 210, can be made larger. Since this wall thickness X-2 at the first thread depth is controlling of the tensile stress that the pin 210 can carry, the greater the wall thickness at X-2, the greater the strength of the connection C-2 as has been previously disclosed.

Both the connection C-1 and C-2 are provided with sufficient load carrying surface on the loading flanks that the tensile efficiency is in excess of the tube body yield strength. This enables some permanent stretching of the string of tubular goods with a minimum risk of "pulling out" by the connection itself yielding. In addition, the tensile strength of the connection C-1 and C-2 approaches that of the tube body ultimate tensile strength.

The foregoing disclosure and description of the invention are illustrative and explanatory thereof, and various changes in the size, shape and materials as well as in the details of the illustrated construction may be made without departing from the spirit of the invention.

We claim:

1. A high tensile strength threaded connection for releasably securing separate members by rotational make-up of a threaded male member with a threaded female member along a common longitudinal axis to form the connection, including:

a male member having an external helical thread means formed thereon, said external thread means having a negative angled loading flank relative to the longitudinal axis of the threaded connection;

a female member forming a longitudinal axis and having an internal helical thread means formed thereon, said a female member having an internal helical thread means formed thereon, said internal thread means also having a negative angled loading flank for engaging said negative angled loading flank of said external thread means formed on said male member;

a first make-up limiting means formed on said male member;

a second make-up limiting means formed on said female member for engagement with said first make-up limiting means formed on said male member for limiting rotational make-up of said helical thread means;

a portion of external thread means having a loading flank of a smaller loading area than the remainder of said external thread means loading flank to minimize the critical reduction of thickness of said male member; and said female member having at least a portion thereof of reduced strength relative to the remainder of said female member located adjacent said smaller loading area loading flank of said female member to insure a more uniform distribution of the loading on the negative angled smaller area loading flanks wherein the tensile loading on the thread loading flank is distributed on said male and female members to enhance tensile strength of the threaded connection.

2. The threaded connection of claim 1, wherein:
   said male member and said female members are tubular members.

3. The threaded connection of claim 1, wherein:
   said external helical thread means on said male member and said internal helical thread means on said female member provided with sufficient clearance therebetween to prevent formation of radial interference stress as a result of threaded make-up of said male member and said female member.

4. The thread connection of claim 1, wherein:
said female member having a portion thereof of sufficiently reduced wall thickness adjacent said internal helical threads to enable radial inward movement with said inwardly radial male member to minimize pulling out of said threaded connection in response to tensile loading.

5. The threaded connector of claim 1, including:
a third thread make-up limiting means formed on said male member spaced a longitudinal direction from said first make-up limiting means; and
a fourth make-up limiting means formed on said female member for engaging with said third make-up limiting means of said male member substantially with said make-up limiting engagement of said first make-up limiting means on said male member with said second make-up limiting means on said female member wherein said helical thread means are protected from damage.

6. The threaded connector of claim 1, including:
said external helical thread means and said internal helical thread means are cylindrical having a substantial constant diameter.

7. The threaded connector of claim 6, including:
said external helical thread means having a second negatively angled loading flank of a smaller substantially constant diameter and full loading area; and
said internal helical thread means having a second negatively angled load flank of the smaller substantially constant diameter for engaging the second negative angled loading flanks of the external thread means, said second negatively angled loading flanks having full loading area engagement upon make-up.

8. The threaded connector of claim 7, wherein:
said portion of said external threads having the smaller loading flank area formed on a substantially constant diameter; and
said external threads having the full loading flank area formed on a smaller constant diameter than said diameter of said external threads having the smaller loading flank area.

9. A threaded male member adapted to be rotationally made up with a threaded female member to form a high tensile strength threaded connection, including:
a male member forming a longitudinal axis and having an external helical thread means formed thereon, said external thread means having a negative angled loading flank relative to the longitudinal axis of the threaded male member for engaging a loading flank of a complementary internal helical thread means formed on the female member;
a first make-up limiting means formed on said male member for engagement with a second make-up limiting means formed on the female member for limiting rotational make-up of said helical thread means formed on said male member;
a portion of said external thread means having a loading flank of a smaller loading area than the remainder of said external thread means loading flank for engaging a smaller loading flank portion of the female member thread means and to minimize the critical reduction of thickness of said male member; and said smaller loading area flanks adapted for mating with a reduced strength portion of the female member to enable elastic strain of the female member of said portion relative to the remainder of said female member to insure uniform distribution of the tensile loading on the negative angled smaller area loading flanks of the male member wherein the tensile loading on the thread loading flanks of the male member is more uniformly distributed on the female member to enhance tensile strength of the formed threaded connection.

10. The threaded male member of claim 9, wherein:
said male member is a tubular member.

11. The threaded male member of claim 9, wherein:
said external helical thread means on said male member is provided with sufficient clearance relative to the internal helical thread means on said female member to prevent formation of radial interference stress as a result of threaded make-up of said male member into the threaded female member.

12. The threaded male member of claim 9, including:
a third thread make-up limiting shoulder formed on said male member spaced a longitudinal distance from said first make-up limiting shoulder for engaging with a fourth make-up limiting shoulder formed on the female member substantially with the make-up limiting engagement of said first make-up limiting shoulder on said male member with the second make-up limiting shoulder on the female member wherein said helical thread means are protected from damage by over-torquing.

13. The threaded male member of claim 9, including:
said external helical thread means are cylindrical.

14. The threaded male member of claim 13, including:
said portion of said external threads having the smaller loading flank area formed on a substantially constant diameter; and
said external threads having the full loading flank area formed on a smaller constant diameter than said diameter of said external threads having the smaller loading flank area.

15. A threaded female member adapted to be rotationally made up with a threaded male member to form a high tensile strength threaded connection, including:
a female member forming a longitudinal axis and having an internal helical thread means formed thereon, said internal thread means having a negative angled loading flank relative to the longitudinal axis of the threaded female member for engaging complementary loading flanks of a small and a large loading flank area on a complementary external helical thread means formed on the male member;
a first make-up limiting means formed on said female member for engagement with a second make-up limiting means formed on the male member for limiting rotational make-up of said helical thread means formed on said female member; and
said female member having a reduced strength portion relative to the remainder of said female member to enable longitudinal elastic strain of the female member to insure a more uniform distribution of the tensile loading on the negative angled smaller loading area flanks of the male member to minimize the critical reduction of thickness of the male member adjacent said external helical thread means wherein the tensile loading flanks of said female member is more uniformly distributed to enhance tensile strength of the formed threaded connection.

16. The threaded female member of claim 15, wherein:
said female member is a tubular member.

17. The threaded male member of claim 15, wherein:
said internal helical thread means on said female member is provided with sufficient clearance relative to the external helical thread means on the male member to prevent formation of radial interference stress as a result of threaded make-up of said female member in the threaded connection.

18. The threaded male member of claim 15, including:
a third thread make-up limiting shoulder formed on said female member spaced a longitudinal distance from said first make-up limiting shoulder for engaging with a fourth make-up limiting shoulder formed on the male member substantially with the make-up limiting engagement of said first make-up limiting shoulder on the male member wherein said helical thread means are protected from damage.

19. The threaded male member of claim 15, including:
said internal helical thread means are cylindrical.

20. The threaded male member of claim 19, including:
said portion of said internal threads having the smaller loading flank area formed on a substantially constant diameter; and
said internal threads having the full loading flank area formed on a smaller constant diameter than said diameter of said internal threads having the smaller loading flank area.

* * * * *